(12) United States Patent
Kim et al.

(10) Patent No.: US 11,563,280 B2
(45) Date of Patent: Jan. 24, 2023

(54) ELECTRONIC DEVICE INCLUDING ANTENNA

(71) Applicant: SAMSUNG ELECTRONICS CO., LTD., Suwon-si (KR)

(72) Inventors: Taekyun Kim, Suwon-si (KR); Haekwon Lee, Suwon-si (KR); Taejoon Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 16/929,329

(22) Filed: Jul. 15, 2020

(65) Prior Publication Data

US 2021/0021055 A1 Jan. 21, 2021

(30) Foreign Application Priority Data

Jul. 18, 2019 (KR) .......................... 10-2019-0086805

(51) Int. Cl.
H01Q 1/24 (2006.01)
H01Q 21/28 (2006.01)
(Continued)

(52) U.S. Cl.
CPC ............. *H01Q 21/28* (2013.01); *H01Q 1/243* (2013.01); *H01Q 5/307* (2015.01); *H01Q 7/00* (2013.01)

(58) Field of Classification Search
CPC ........ H01Q 21/28; H01Q 1/243; H01Q 5/307; H01Q 7/00; H01Q 5/378; H01Q 9/285;
(Continued)

(56) References Cited

U.S. PATENT DOCUMENTS

2013/0109329 A1 5/2013 Na et al.
2016/0190690 A1 6/2016 Badran et al.
(Continued)

FOREIGN PATENT DOCUMENTS

KR 10-2013-0048610 5/2013
KR 10-2016-0072567 6/2016
(Continued)

OTHER PUBLICATIONS

International Search Report dated Oct. 22, 2020 in corresponding International Application No. PCT/KR2020/009227.
(Continued)

*Primary Examiner* — Hai V Tran
*Assistant Examiner* — Michael M Bouizza
(74) *Attorney, Agent, or Firm* — Nixon & Vanderhye P.C.

(57) ABSTRACT

In various embodiments, an electronic device may include: a housing including an inner space, and a first antenna structure disposed in the inner space of the housing, the first antenna structure including: a dielectric substrate, at least one first conductor disposed in a first area of the dielectric substrate, and at least one second conductor disposed in a second area of the dielectric substrate extending from the first area of the dielectric substrate. The electronic device may further include at least one third conductor capacitively coupled with the at least one second conductor, a first wireless communication circuit configured to transmit and/or receive a signal of a first frequency band through the at least one first conductor, and a second wireless communication circuit configured to transmit and/or receive a radio signal of a second frequency band through the at least one second conductor and the at least one third conductor.

20 Claims, 15 Drawing Sheets

(51) Int. Cl.
*H01Q 5/307* (2015.01)
*H01Q 7/00* (2006.01)

(58) Field of Classification Search
CPC ........ H01Q 1/2208; H01Q 1/22; H01Q 1/242; H04B 5/0025; H04M 1/026
See application file for complete search history.

(56) References Cited

U.S. PATENT DOCUMENTS

| | | |
|---|---|---|
| 2016/0254588 A1 | 9/2016 | Kim et al. |
| 2016/0351998 A1 | 12/2016 | Ahn et al. |
| 2017/0338545 A1* | 11/2017 | Guo .................. H01Q 21/28 |
| 2018/0090817 A1 | 3/2018 | Rajagopalan et al. |
| 2018/0301790 A1 | 10/2018 | Kim et al. |
| 2018/0331418 A1 | 11/2018 | Kim et al. |
| 2020/0210803 A1 | 7/2020 | Ochi et al. |

FOREIGN PATENT DOCUMENTS

| | | |
|---|---|---|
| KR | 10-2018-0124621 | 11/2018 |
| WO | 2019/077830 | 4/2019 |

OTHER PUBLICATIONS

Extended European Search Report dated Jun. 14, 2022 for EP Application No. 20841291.6.

* cited by examiner

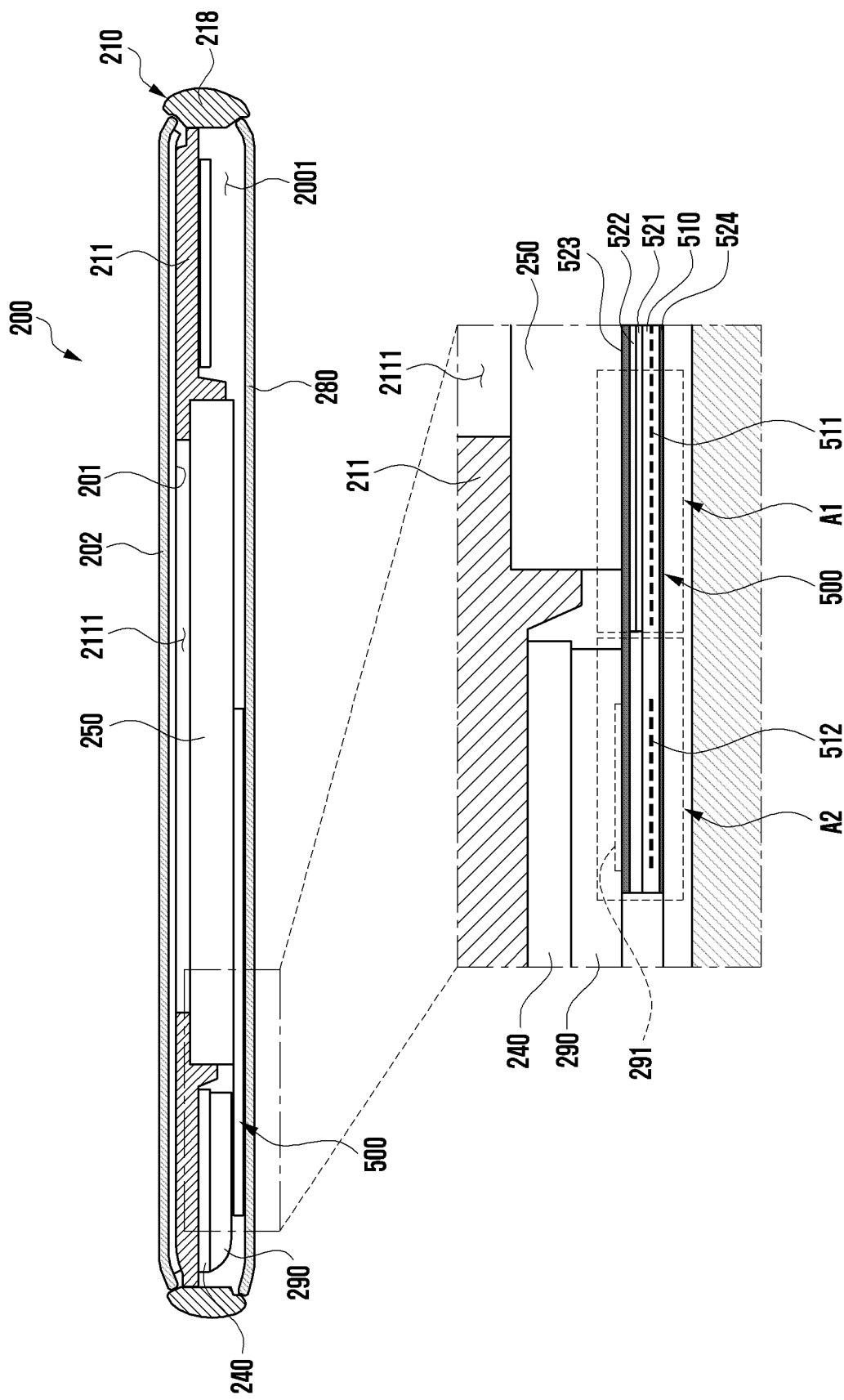

ELECTRONIC DEVICE INCLUDING ANTENNA

CROSS-REFERENCE TO RELATED APPLICATION

This application is based on and claims priority under 35 U.S.C. § 119 to Korean Patent Application No. 10-2019-0086805, filed on Jul. 18, 2019, in the Korean Intellectual Property Office, the disclosure of which is incorporated by reference herein in its entirety.

BACKGROUND

Field

The disclosure relates to an electronic device including an antenna.

Description of Related Art

With the growth of electronic communication technologies, a great variety of electronic devices having various functionalities have emerged. In accordance with a convergence trend, such electronic devices typically perform their various functions in combination.

In recent years, electronic devices have been also developed from a design standpoint, outgrowing a functional standpoint. In addition, for the convenience of portability, the development is progressing toward a design of slim appearance. A slim electronic device needs to consider the efficient arrangement of electronic components disposed in an inner space. Therefore, in the inner space of the electronic device, some electronic components may share their mounting structures.

A portable electronic device such as a mobile communication terminal or a smart phone is capable of not only communicating with another electronic device located remotely through a wireless communication circuit and at least one antenna structure, but also being connected to any external device disposed at a short range through a certain network (e.g., WiFi, Bluetooth, infrared communication, or ZigBee). In this case, an antenna structure provided for short-range communication in the inner space of the electronic device operates in a relatively low frequency band and thereby has a relatively large size of a conductive pattern (or coil) used as an antenna radiator than that of a typical antenna radiator operating in a legacy band. Accordingly, there is a need to consider an efficient mounting space in the electronic device.

SUMMARY

Embodiments of the disclosure may provide an electronic device including an antenna.

Embodiments of the disclosure may provide an electronic device including an antenna effectively mounted to contribute to a slim design of the electronic device.

Embodiments of the disclosure may provide an electronic device including an antenna with an improved radiation performance without an increase of a mounting space.

According to various example embodiments of the disclosure, an electronic device may include: a housing including an inner space, and a first antenna structure disposed in the inner space of the housing, the first antenna structure including: a dielectric substrate, at least one first conductor disposed in a first area of the dielectric substrate, and at least one second conductor disposed in a second area of the dielectric substrate extending from the first area of the dielectric substrate. The electronic device may further include at least one third conductor capacitively coupled with the at least one second conductor, a first wireless communication circuit configured to transmit and/or receive a signal of a first frequency band through the at least one first conductor, and a second wireless communication circuit configured to transmit and/or receive a radio signal of a second frequency band through the at least one second conductor and the at least one third conductor.

According to various example embodiments of the disclosure, an electronic device may include a housing including an inner space, and a first antenna structure disposed in the inner space of the housing, the first antenna structure including: a dielectric substrate, at least one first conductor disposed in a first area of the dielectric substrate, and at least one second conductor disposed in a second area of the dielectric substrate extending from the first area of the dielectric substrate. The electronic device may further include a first wireless communication circuit configured to transmit and/or receive a signal of a first frequency band through the at least one first conductor, and a second wireless communication circuit configured to transmit and/or receive a radio signal of a second frequency band through the at least one second conductor.

BRIEF DESCRIPTION OF THE DRAWINGS

The above and other aspects, features and advantages of certain embodiments of the present disclosure will be more apparent from the following detailed description, taken in conjunction with the accompanying drawings.

FIG. 3 is a cross-sectional view of the example electronic device taken along the line A-A' of FIG. 2A;

DETAILED DESCRIPTION

The following description is made with reference to the accompanying drawings and is provided to assist in a comprehensive understanding of various embodiments of the disclosure as defined by the claims and their equivalents. It includes various specific details to assist in that understanding but these are to be regarded as merely examples. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, and may include arbitrarily selected terms. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
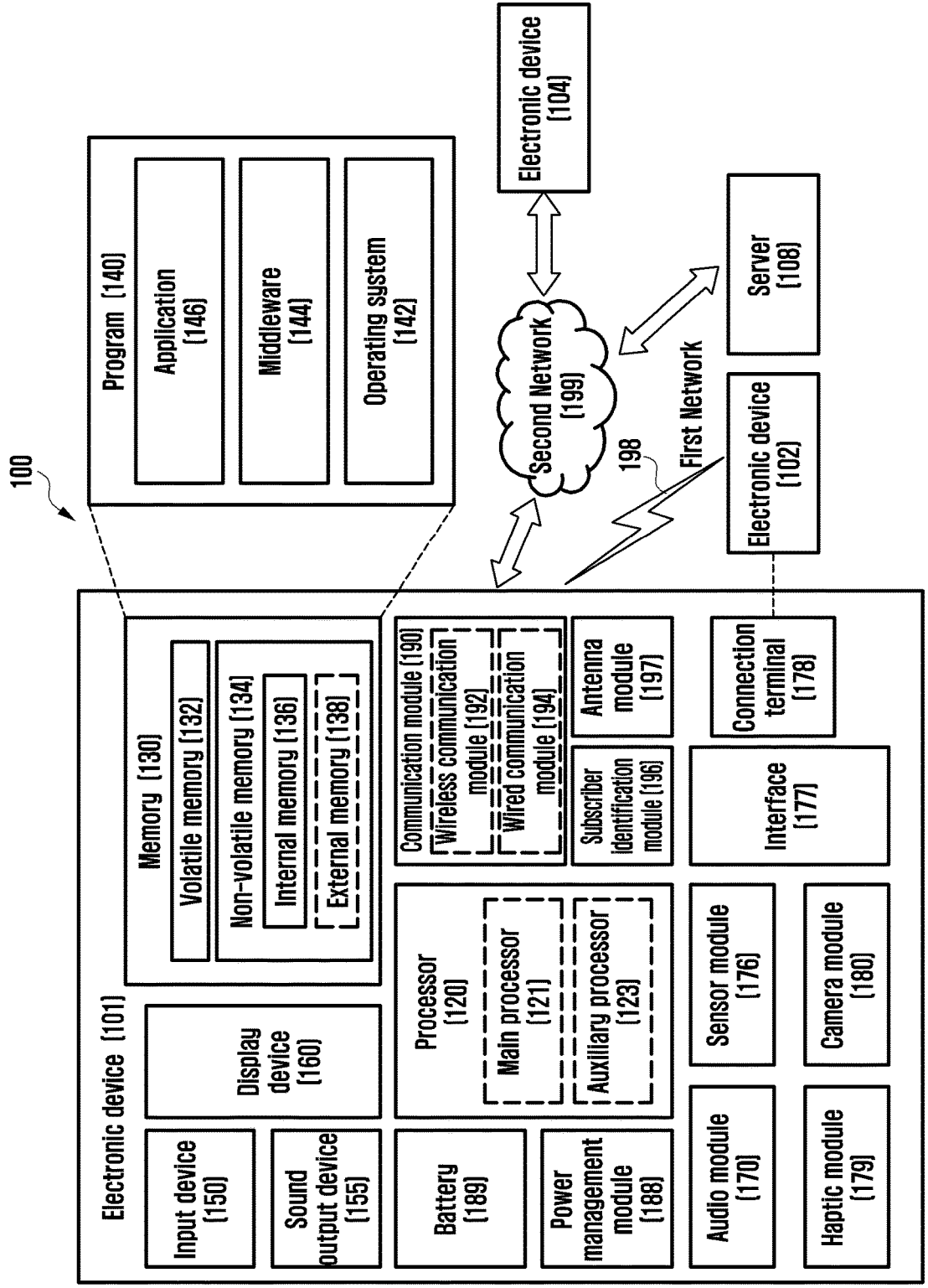
FIG. 1 is a block diagram illustrating an example electronic device in a network environment according to various embodiments of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
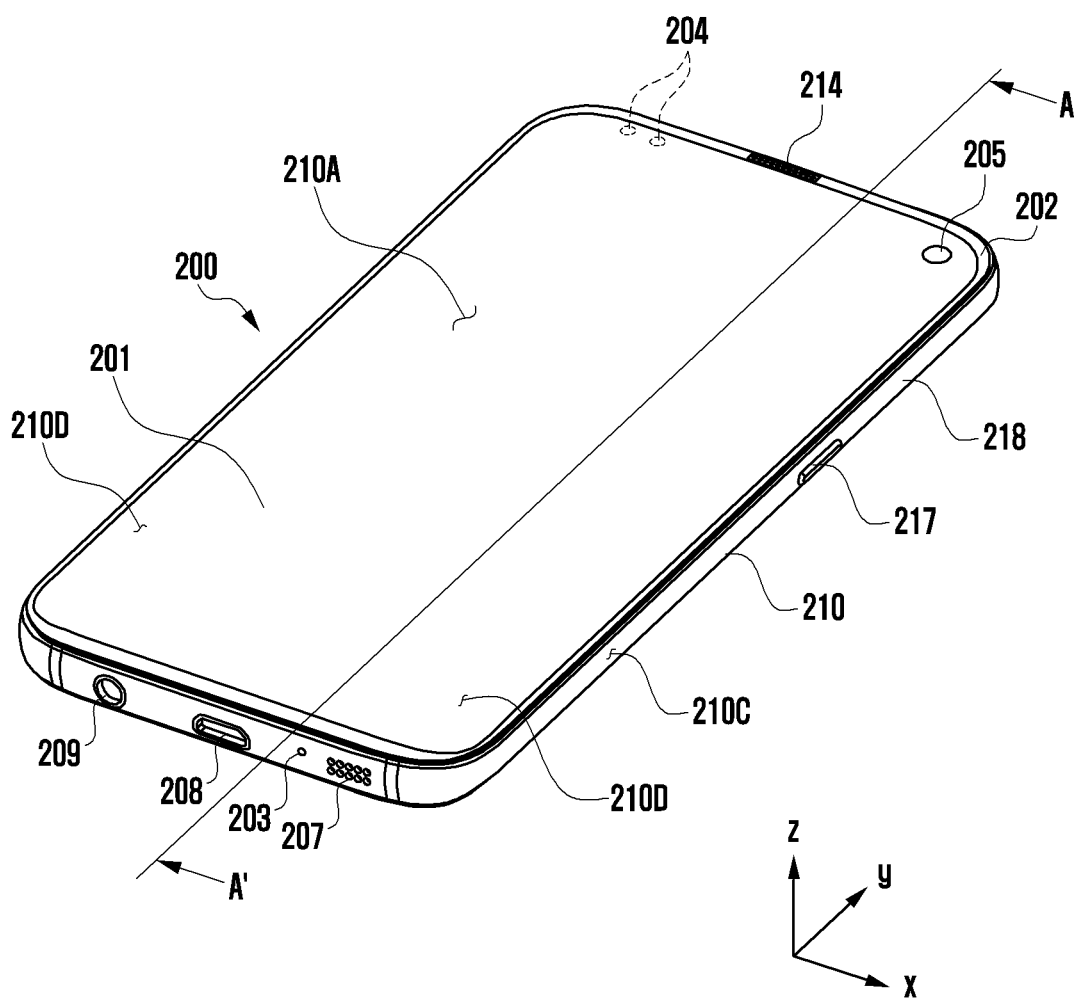
FIG. 2A is a front perspective view illustrating an example mobile electronic device according to various embodiments of the disclosure.
Figure 2B:
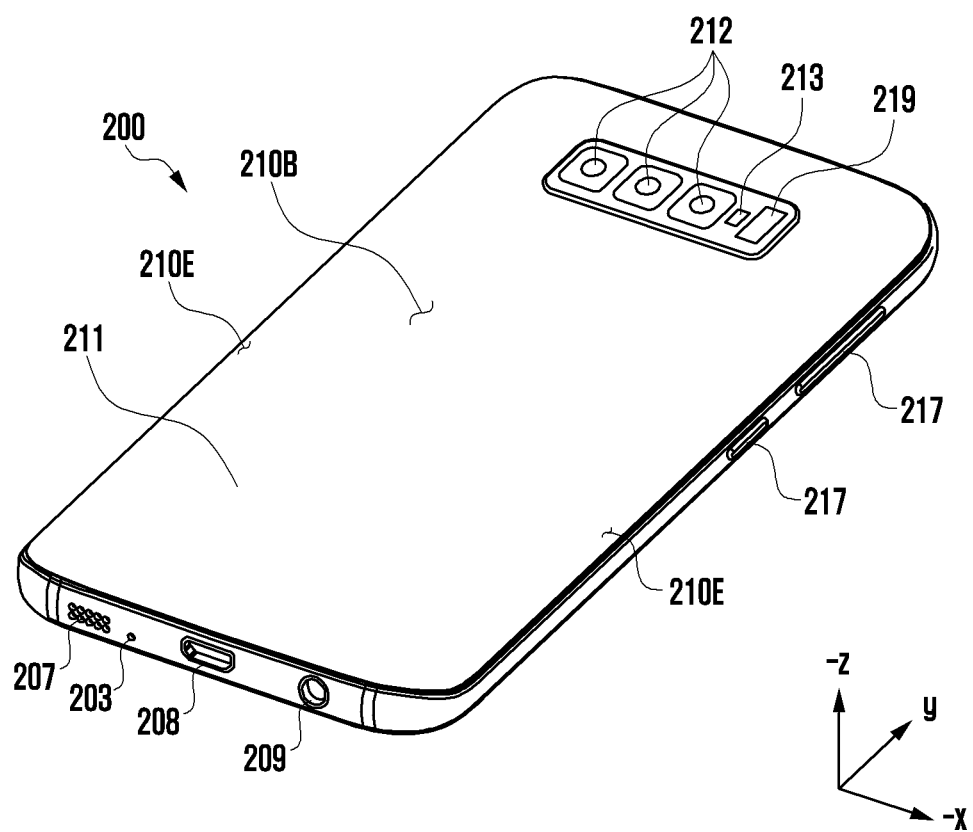
FIG. 2B is a rear perspective view illustrating the example mobile electronic device shown in FIG. 2A.

FIG. 2A is a front perspective view illustrating an example mobile electronic device 200 according to an embodiment, and FIG. 2B is a rear perspective view illustrating the example mobile electronic device 200 shown in FIG. 2A.

Referring to FIGS. 2A and 2B, the mobile electronic device 200 may include a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202 (or the rear plate 211) may include only one of the first regions 210D (or of the second regions 210E). The first regions 210D or the second regions 210E may be omitted in part. When viewed from a lateral side of the mobile electronic device 200, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

The mobile electronic device 200 may include at least one of a display 201, audio modules 203, 207 and 214, sensor modules 204 and 219, camera modules 205, 212 and 213, a key input device 217, a light emitting device, and connector holes 208 and 209. The mobile electronic device 200 may omit at least one (e.g., the key input device 217 or the light emitting device) of the above components, or may further include other components.

The display 201 may be exposed through a substantial portion of the front plate 202, for example. At least a part of the display 201 may be exposed through the front plate 202 that forms the first surface 210A and the first region 210D of the lateral surface 210C. Outlines (e.g., edges and corners) of the display 201 may have substantially the same form as those of the front plate 202. The spacing between the outline of the display 201 and the outline of the front plate 202 may be substantially unchanged in order to enlarge the exposed area of the display 201.

A recess or opening may be formed in a portion of a display area of the display 201 to accommodate at least one of the audio module 214, the sensor module 204, the camera module 205, and the light emitting device. At least one of the audio module 214, the sensor module 204, the camera module 205, the fingerprint sensor (not shown), and the light emitting element may be disposed on the back of the display area of the display 201. The display 201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217 may be disposed in the first region 210D and/or the second region 210E.

The audio modules 203, 207 and 214 may correspond to a microphone hole 203 and speaker holes 207 and 214, respectively. The microphone hole 203 may contain a microphone disposed therein for acquiring external sounds and, in a case, contain a plurality of microphones to sense a sound direction. The speaker holes 207 and 214 may be classified into an external speaker hole 207 and a call receiver hole 214. The microphone hole 203 and the speaker holes 207 and 214 may be implemented as a single hole, or a speaker (e.g., a piezo speaker) may be provided without the speaker holes 207 and 214.

The sensor modules 204 and 219 may generate electrical signals or data corresponding to an internal operating state of the mobile electronic device 200 or to an external environmental condition. The sensor modules 204 and 219 may include a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212 and 213 may include a first camera device 205 disposed on the first surface 210A of the electronic device 200, and a second camera device 212 and/or a flash 213 disposed on the second surface 210B. The camera module 205 or the camera module 212 may include one or more lenses, an image sensor, and/or an image signal processor. The flash 213 may include, for example, a light emitting diode or a xenon lamp. Two or more lenses (infrared cameras, wide angle and telephoto lenses) and image sensors may be disposed on one side of the electronic device 200.

The key input device 217 may be disposed on the lateral surface 210C of the housing 210. The mobile electronic device 200 may not include some or all of the key input device 217 described above, and the key input device 217 which is not included may be implemented in another form such as a soft key on the display 201. The key input device 217 may include the sensor module disposed on the second surface 210B of the housing 210.

The light emitting device may be disposed on the first surface 210A of the housing 210. For example, the light emitting device may provide status information of the electronic device 200 in an optical form. The light emitting device may provide a light source associated with the operation of the camera module 205. The light emitting device may include, for example, a light emitting diode (LED), an IR LED, or a xenon lamp.

The connector holes 208 and 209 may include a first connector hole 208 adapted for a connector (e.g., a USB connector) for transmitting and receiving power and/or data to and from an external electronic device, and/or a second connector hole 209 adapted for a connector (e.g., an earphone jack) for transmitting and receiving an audio signal to and from an external electronic device.

Some sensor modules 205 of camera modules 205 and 212, some sensor modules 204 of sensor modules 204 and 219, or an indicator may be arranged to be exposed through a display 201. For example, the camera module 205, the sensor module 204, or the indicator may be arranged in the internal space of an electronic device 200 so as to be brought into contact with an external environment through an opening of the display 201, which is perforated up to a front plate 202. In another embodiment, some sensor modules 204 may be arranged to perform their functions without being visually exposed through the front plate 202 in the internal space of the electronic device. For example, in this case, an area of the display 201 facing the sensor module may not require a perforated opening.

Figure 2C:
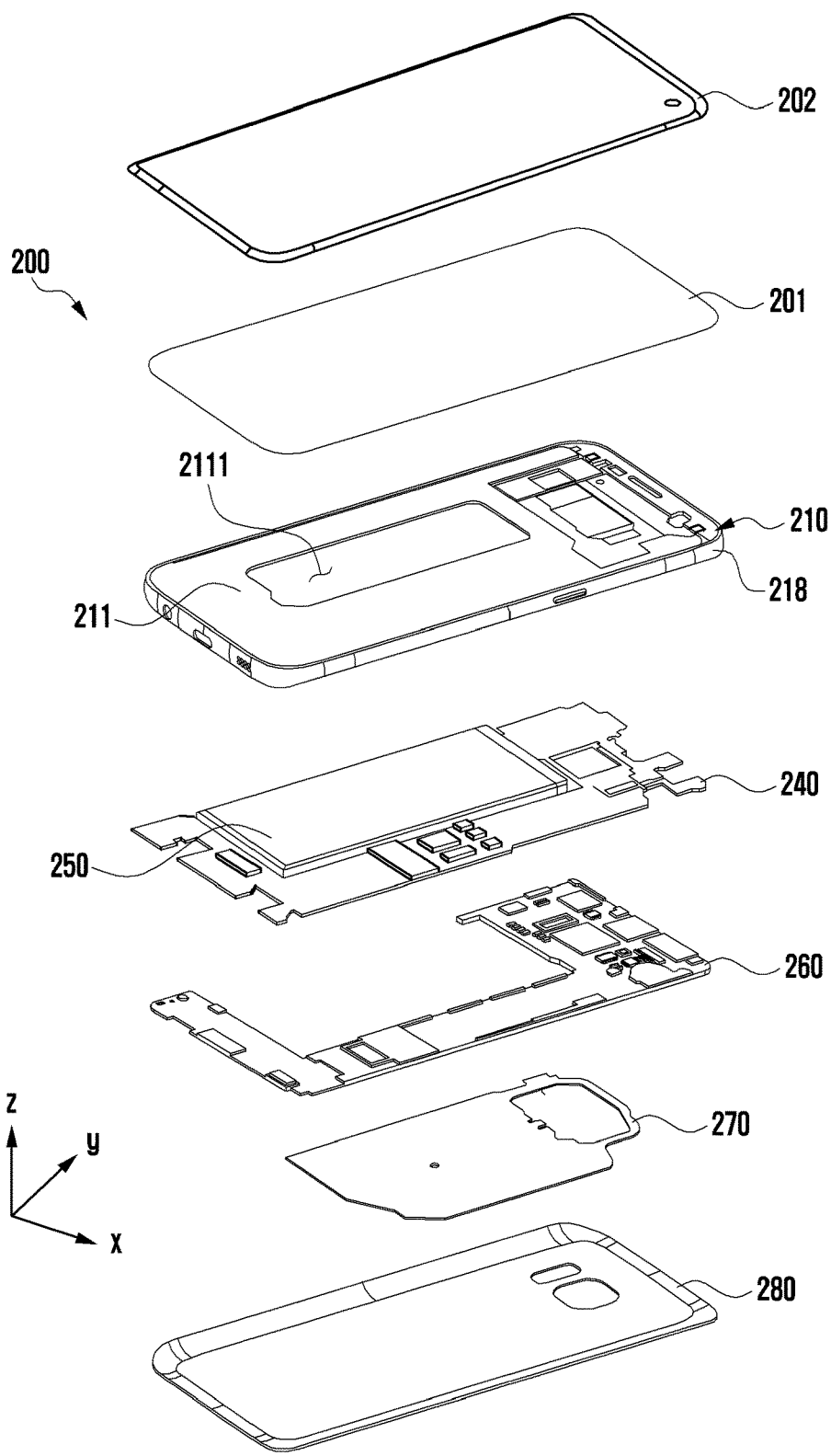
FIG. 2C is an exploded perspective view illustrating the example mobile electronic device shown in FIGS. 2A and 2B.

FIG. 2C is an exploded perspective view illustrating the example mobile electronic device 200 shown in FIGS. 2A and 2B.

Referring to FIG. 2C, the mobile electronic device 200 may include a lateral bezel structure 210, a first support member 211 (e.g., a bracket), a front plate 202, a display 201, an electromagnetic induction panel, a PCB 240, a battery 250, a second support member 260 (e.g., a rear case), an antenna 270, and a rear plate 280. The mobile electronic device 200 may omit at least one (e.g., the first support member 211 or the second support member 260) of the above components or may further include another component. Some components of the electronic device 200 may be the same as or similar to those of the mobile electronic device 200 shown in FIG. 2A or FIG. 2B, thus, descriptions thereof may not be repeated below. The first support member 211 may include a swelling hole 2111 to adapt at least a part of the battery 250.

The first support member 211 is disposed inside the mobile electronic device 200 and may be connected to, or integrated with, the lateral bezel structure 210. The first support member 211 may be formed of, for example, a metallic material and/or a non-metal (e.g., polymer) material. The first support member 211 may be combined with the display 201 at one side thereof and also combined with the PCB 240 at the other side thereof. On the PCB 240, a processor, a memory, and/or an interface may be mounted. The processor may include, for example, one or more of a CPU, an AP, a GPU, an ISP, a sensor hub processor, or a CP.

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the mobile electronic device 200 with an external electronic device and may include a USB connector, an SD card/multimedia card (MMC) connector, or an audio connector.

The battery 250 is a device for supplying power to at least one component of the mobile electronic device 200, and may include, for example, a non-rechargeable primary battery, a rechargeable secondary battery, or a fuel cell. At least a part of the battery 250 may be disposed on substantially the same plane as the PCB 240. The battery 250 may be integrally disposed within the mobile electronic device 200, and may be detachably disposed from the mobile electronic device 200.

The antenna 270 may be disposed between the rear plate 280 and the battery 250. The antenna 270 may include, for example, a near field communication (NFC) antenna, a wireless charging antenna, and/or a magnetic secure transmission (MST) antenna. The antenna 270 may perform short-range communication with an external device, or transmit and receive power required for charging wirelessly. An antenna structure may be formed by a part or combination of the lateral bezel structure 210 and/or the first support member 211.

FIG. 3 is a cross-sectional view of the example electronic device taken along the line A-A' of FIG. 2A.

Referring to FIG. 3, the electronic device 200 may include a housing 210 that includes a front cover 202 (e.g., a front plate), a rear cover 280 (e.g., a rear plate) facing a direction opposite to the front cover, and a lateral member 218 surrounding a space 2001 between the front cover 202 and the rear cover 280. According to an embodiment, the electronic device 200 may further include a support member 211 extending at least in part from the lateral member 218 to the inner space 2001. According to an embodiment, the support member 211 may be disposed through structural coupling with the lateral member 218. According to an embodiment, each of the lateral member 218 and the support member 211 may be formed to include, at least in part, a polymer portion and/or a conductive portion. According to an embodiment, the electronic device 200 may include a display 201 supported by the support member 211 and disposed in the inner space 2001 to be seen to the outside through at least a part of the front cover 202. According to an embodiment, the electronic device 200 may include a battery 250 supported by the support member 211 and disposed in the inner space 2001. According to an embodiment, the battery 250 may be disposed to be engaged with a swelling hole 2111 formed in the support member 211. According to an embodiment, the electronic device 200 may include a printed circuit board (PCB) 240 disposed in the inner space 2001. According to an embodiment, when the front cover 202 is viewed from above, the PCB 240 may be disposed side by side with the battery 250 or disposed to be overlapped at least in part with the battery 250.

According to various embodiments, the electronic device 200 may include an antenna structure 500 (e.g., the antenna 270 in FIG. 2C) disposed in the inner space 2001. According to an embodiment, the antenna structure 500 may be disposed between the battery 250 and the rear cover 280. According to an embodiment, the antenna structure 500 may be attached to the battery 250 through, for example, a taping or bonding process. According to an embodiment, the antenna structure 500 may include a dielectric substrate 510, at least one first conductive pattern 511 disposed in a first area A1 of the dielectric substrate 510, and a second conductive pattern 512 disposed in a second area A2 extending from the first area A1. According to an embodiment, the dielectric substrate 510 may be or include a flexible printed circuit board (FPCB) that contains a copper foil pattern therein. According to an embodiment, the at least one first conductive pattern 511 may be used, for example, and without limitation, as a conductor for a near field communication (NFC) function, a wireless power consortium (WPC) function, and/or a magnetic secure transmission (MST) function, or the like. For example, the at least one first conductive pattern 511 may include the copper foil pattern formed in the FPCB. According to an embodiment, the at least one first conductive pattern 511 may include a coil member disposed in the dielectric substrate 510.

According to various embodiments, the antenna structure 500 may include a shielding member (e.g., shield) 521, a heat dissipation member 522, and at least one adhesive member 523 which are sequentially stacked on the dielectric substrate 510. According to an embodiment, the shielding member 521 may be formed of or include a thin metal film. According to an embodiment, the heat dissipation member 522 may be formed of or include a graphite sheet. According to an embodiment, the adhesive member 523 may be formed of or include, for example, a conductive sponge or a conductive poron.

According to various embodiments, the electronic device 200 may include a dielectric structure 290 disposed near the PCB 240 in the inner space 2001, and a third conductive pattern 291 disposed in the dielectric structure 290. According to an embodiment, the dielectric structure 290 may include an antenna carrier. In another embodiment, the dielectric structure 290 may include a polymer portion disposed on the support member 211. In still another embodiment, the dielectric structure 290 may include at least a part of the rear cover 280. According to an embodiment, the third conductive pattern 291 may be or include, for example, a laser direct structuring (LDS) pattern formed in the dielectric structure 290. According to an embodiment, the third conductive pattern 291 may be or include, for example, a metal member attached to the dielectric structure 290. According to an embodiment, the third conductive pattern 291 may be electrically connected to a wireless communication circuit (e.g., the wireless communication module 192 in FIG. 1) mounted on the PCB 240.

According to various embodiments, the second conductive pattern 512 may be disposed to be capacitively coupled with the third conductive pattern 291 at a position of being overlapped at least in part with the third conductive pattern 291 when the front cover 202 is viewed from above. In another embodiment, the second conductive pattern 512 may be disposed at any position capable of being capacitively coupled even if being not overlapped with the third conductive pattern 291. According to an embodiment, the second conductive pattern 512 may be operated as an additional pattern of the third conductive pattern 291 connected to the wireless communication circuit 192. In another embodiment, the second conductive pattern 512 may be directly electrically connected to the wireless communication circuit 192 of the PCB 240.

According to various embodiments, the wireless communication circuit 192 may be configured to transmit and/or receive a radio signal of a specific frequency band (e.g., a legacy band) through the third conductive pattern 291 and the second conductive pattern 512. According to an embodiment, the wireless communication circuit 192 may be configured to transmit and/or receive a radio signal in the range of about 800 MHz to 6000 MHz through the third conductive pattern 291 and the second conductive pattern 512. According to an embodiment, through a capacitively coupling connection between the second conductive pattern 512 and the third conductive pattern 291, it is possible to extend bandwidth in an operating frequency band or shift the operating frequency band in a desired direction. This can improve the radiation performance of the antenna.

Figure 4A:
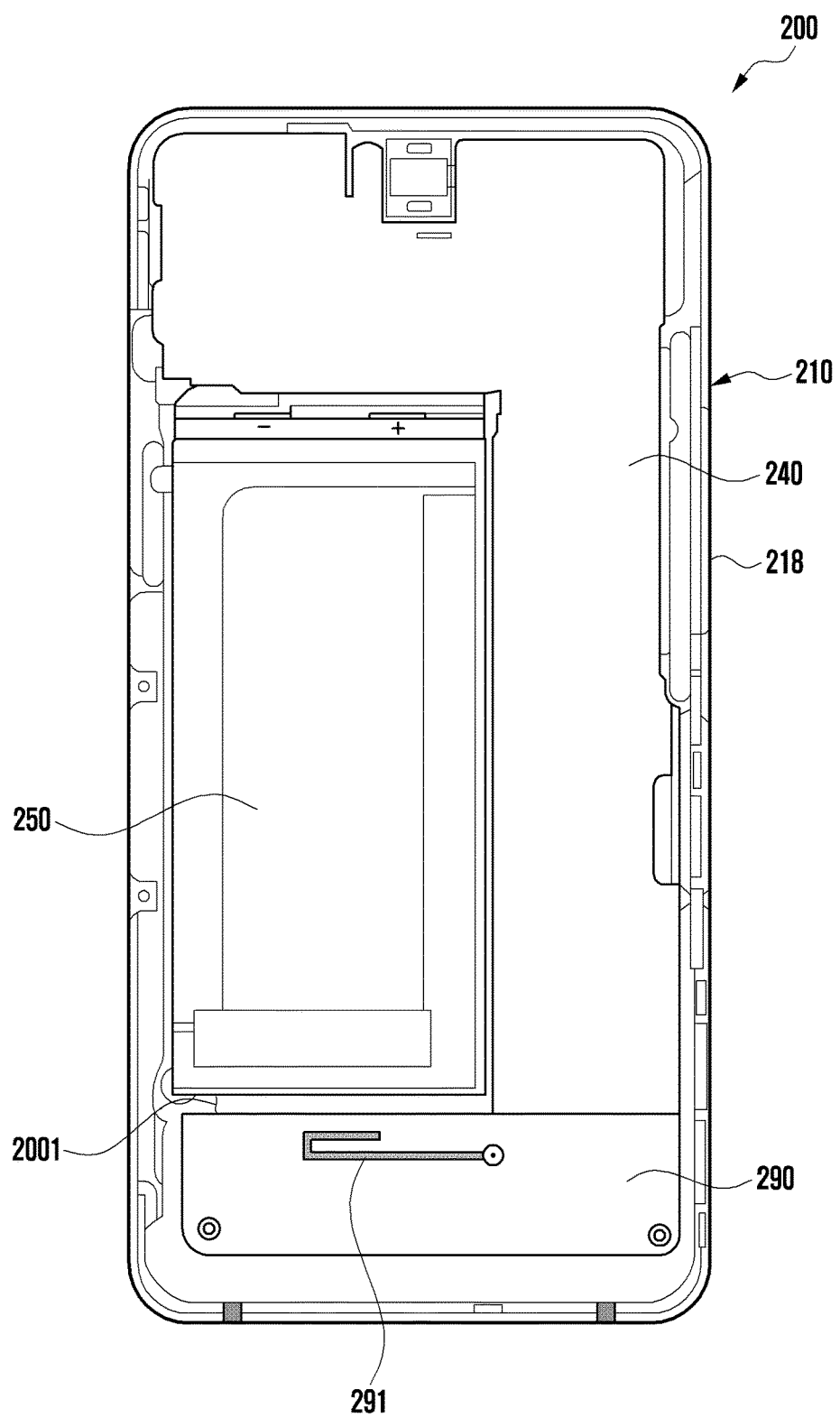
FIG. 4A is a diagram illustrating an example configuration of an example electronic device including a third conductive pattern according to various embodiments of the disclosure.

FIG. 4A is a diagram illustrating an example configuration of an electronic device 200 including a third conductive pattern 291 according to various embodiments of the disclosure.

Referring to FIG. 4A, the electronic device 200 may include the PCB 240 disposed in the inner space 2001 and the battery 250 disposed near the PCB 240 in the inner space 2001. According to an embodiment, the PCB 240 may be disposed side by side with the battery 250. According to an embodiment, the electronic device 200 may include the dielectric structure 290 disposed in the inner space 2001. According to an embodiment, the dielectric structure 290 may be disposed at a position overlapped at least in part with a wireless communication circuit (e.g., the wireless communication circuit 241 in FIG. 5) mounted on the PCB 240 so as to be electrically connected to the wireless communication circuit.

According to various embodiments, the electronic device 200 may include the third conductive pattern 291 disposed in or on the dielectric structure 290. According to an embodiment, the third conductive pattern 291 may include an LDS pattern formed in the dielectric structure 290. According to an embodiment, once the dielectric structure 290 is disposed on the PCB 240 in the inner space 2001 of the electronic device 200, the third conductive pattern 291 may be electrically connected to the wireless communication circuit 241. For example, the PCB 240 may include an electrical connector, such as, for example, and without limitation, a C-clip, electrically connected to the wireless communication circuit 241, and when the dielectric structure 290 is mounted on the PCB 240, a portion of the electrical connector may be in contact with and thus electrically connected to the third conductive pattern 291.

Figure 4B:
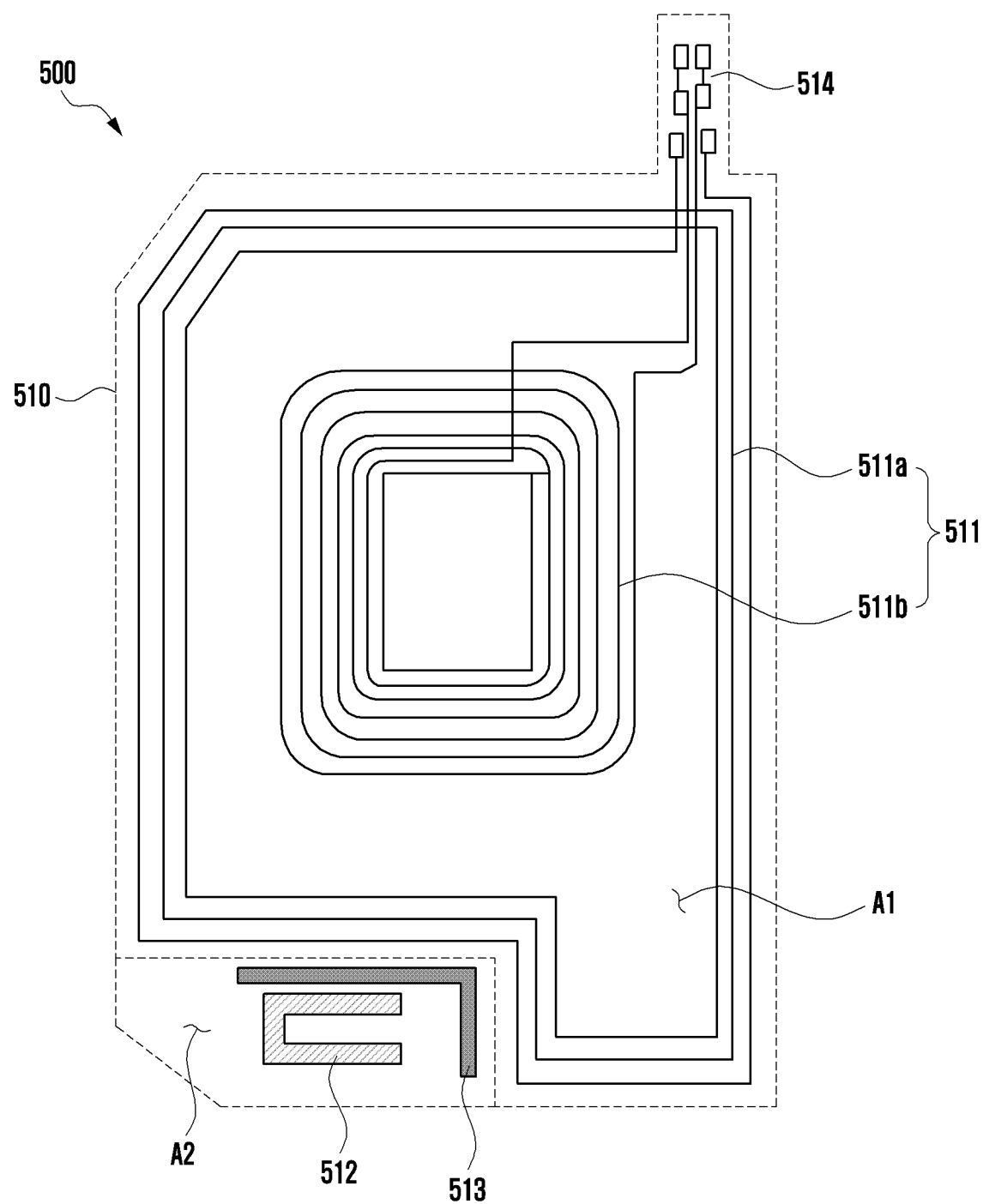
FIG. 4B is a diagram illustrating an example configuration of an antenna structure including a first conductive pattern and a second conductive pattern according to various embodiments of the disclosure.
Figure 4C:
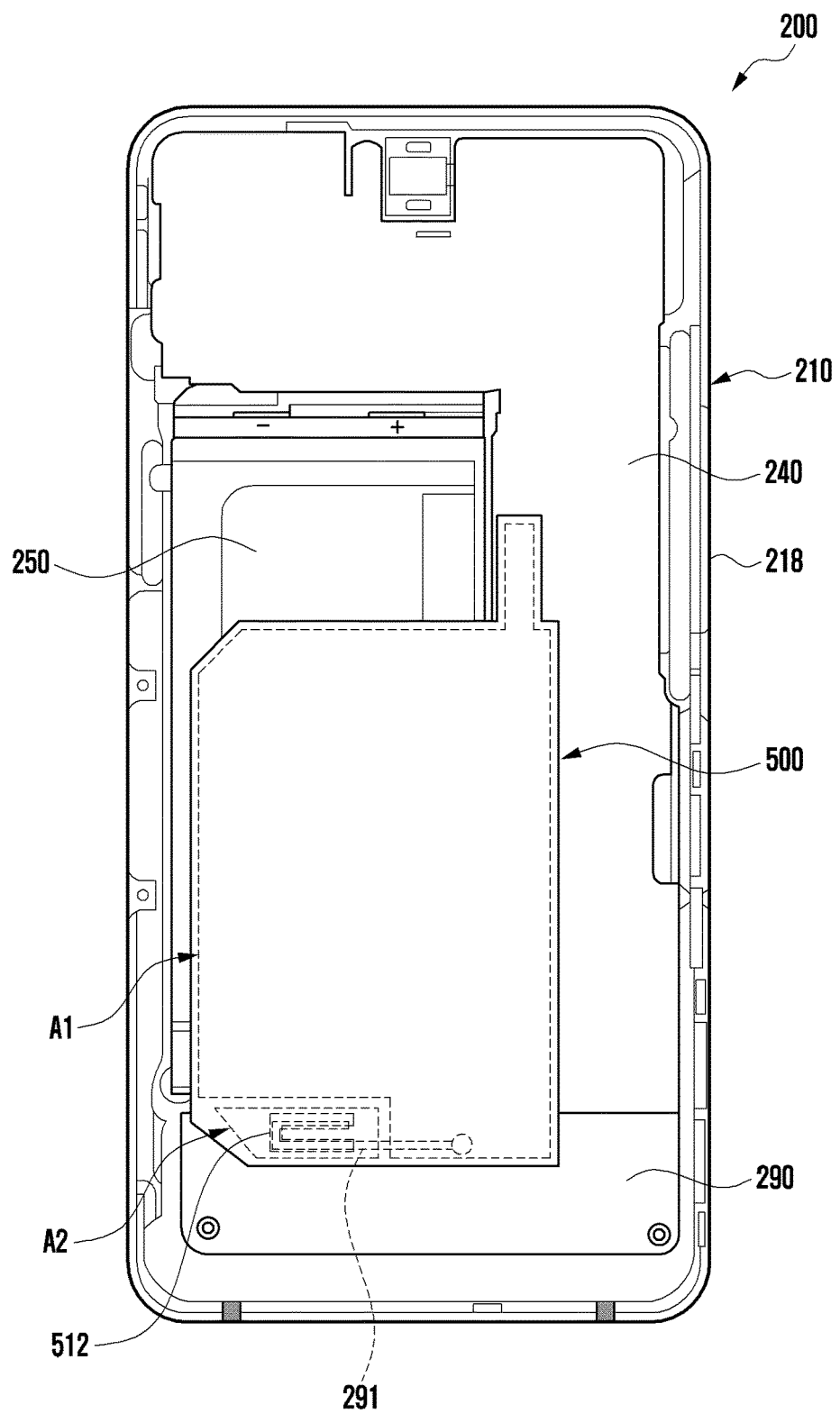
FIG. 4C is a diagram illustrating an example configuration of an example electronic device in which an antenna structure is mounted according to various embodiments of the disclosure.

FIG. 4B is a diagram illustrating an example configuration of an example antenna structure 500 including a first conductive pattern 511 and a second conductive pattern 512 according to various embodiments of the disclosure. FIG. 4C is a diagram illustrating an example configuration of an electronic device 200 in which an antenna structure 500 is mounted according to various embodiments of the disclosure.

Referring to FIGS. 4B and 4C, the electronic device 200 may include the antenna structure 500 disposed to be overlapped with at least a part of the battery 250. According to an embodiment, the antenna structure 500 may be disposed to be overlapped with at least a part of the PCB 240. According to an embodiment, the antenna structure 500 may be disposed to be overlapped with at least a part of the dielectric structure 290.

According to various embodiments, the antenna structure 500 may include the dielectric substrate 510, the at least one first conductive pattern 511 disposed in the first area A1 of the dielectric substrate 510, and the second conductive pattern 512 disposed in the second area A2 extending from the first area A1. According to an embodiment, the at least one first conductive pattern 511 may include a conductive pattern 511a for performing the NFC function, a conductive pattern or coil 511b for performing the WPC function, and/or a conductive pattern (not shown) for performing the MST function. According to an embodiment, the second conductive pattern 512 may be disposed to be capacitively coupled with the third conductive pattern 291 at a position of being overlapped at least in part with the third conductive pattern 291 when the front cover 202 is viewed from above. According to an embodiment, the second conductive pattern 512 may be operated as an additional pattern of the third conductive pattern 291 connected to the wireless communication circuit (e.g., the wireless communication circuit 241 in FIG. 5). According to an embodiment, the at least one first conductive pattern 511 may be electrically coupled with the PCB 240 through a contact portion 514 extending from the dielectric substrate 510.

According to various embodiments, the antenna structure 500 may include at least one conductive shielding member 513 disposed near a boundary between the first area A1 and the second area A2. According to an embodiment, the conductive shielding member 513 may be disposed as a pattern formed on the FPCB. According to an embodiment, the conductive shielding member 513 may be disposed in the second area A2 to surround at least in part the second conductive pattern 512. According to an embodiment, the conductive shielding member 513 may reduce an affect the at least one first conductive pattern 511 and the second conductive pattern 512 may have on each other.

Figure 5:
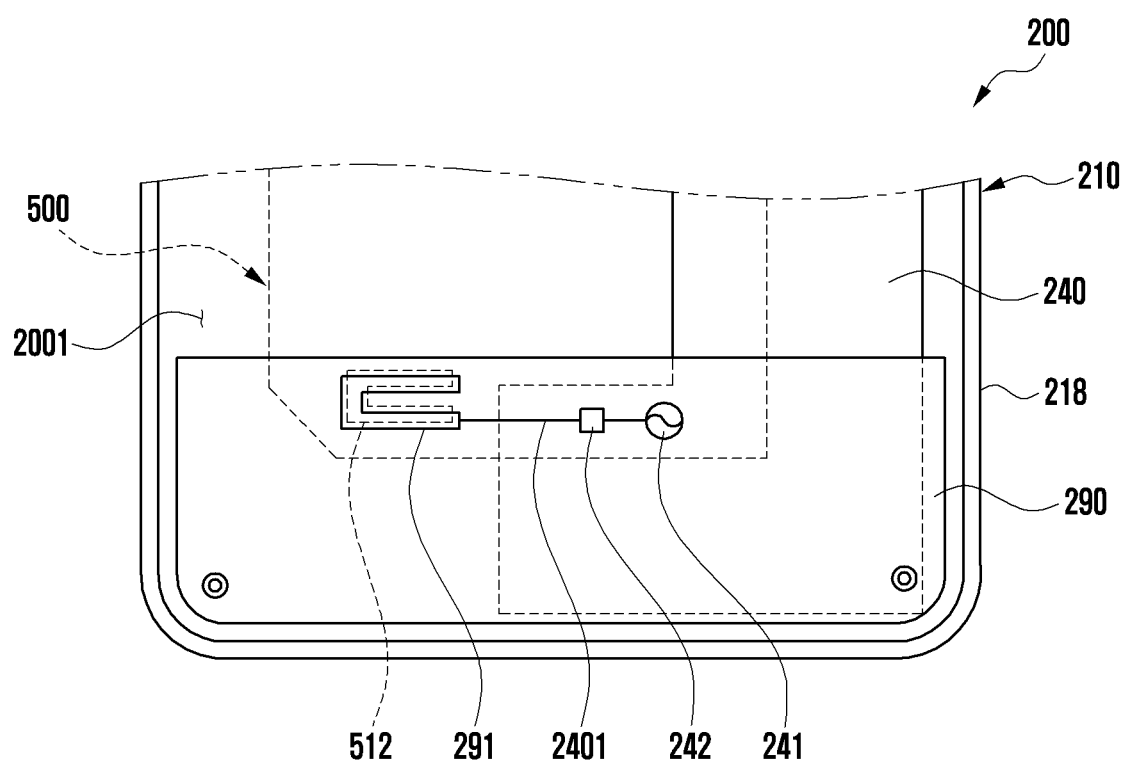
FIG. 5 is a diagram illustrating an example antenna arrangement of an electronic device according to various embodiments of the disclosure.

FIG. 5 is a diagram illustrating an example antenna arrangement of an electronic device 200 according to various embodiments of the disclosure.

Referring to FIG. 5, the electronic device 200 may include the wireless communication circuit 241 disposed on the PCB 240. According to an embodiment, the wireless communication circuit 241 may be electrically connected to the third conductive pattern 291 of the dielectric structure 290 through an electrical path 2401 (e.g., a wiring line). According to an embodiment, the electronic device 200 may include a matching circuit 242 disposed on the electrical path 241. According to an embodiment, the matching circuit 242 may include at least one passive element (e.g., a capacitor or an inductor) mounted on the PCB 240.

According to various embodiments, the electronic device 200 may include the antenna structure 500 that is disposed in the inner space 2001 and includes the second conductive pattern 512. For example, the second conductive pattern 512 may be overlapped at least in part with and capacitively coupled with the third conductive pattern 291, thereby affecting the radiation performance of the third conductive pattern 291. According to an embodiment, the wireless communication circuit 241 may be configured to transmit and/or receive a radio signal in a specific frequency band through the second conductive pattern 512 and the third conductive pattern 291 with improved radiation performance.

Figure 6:
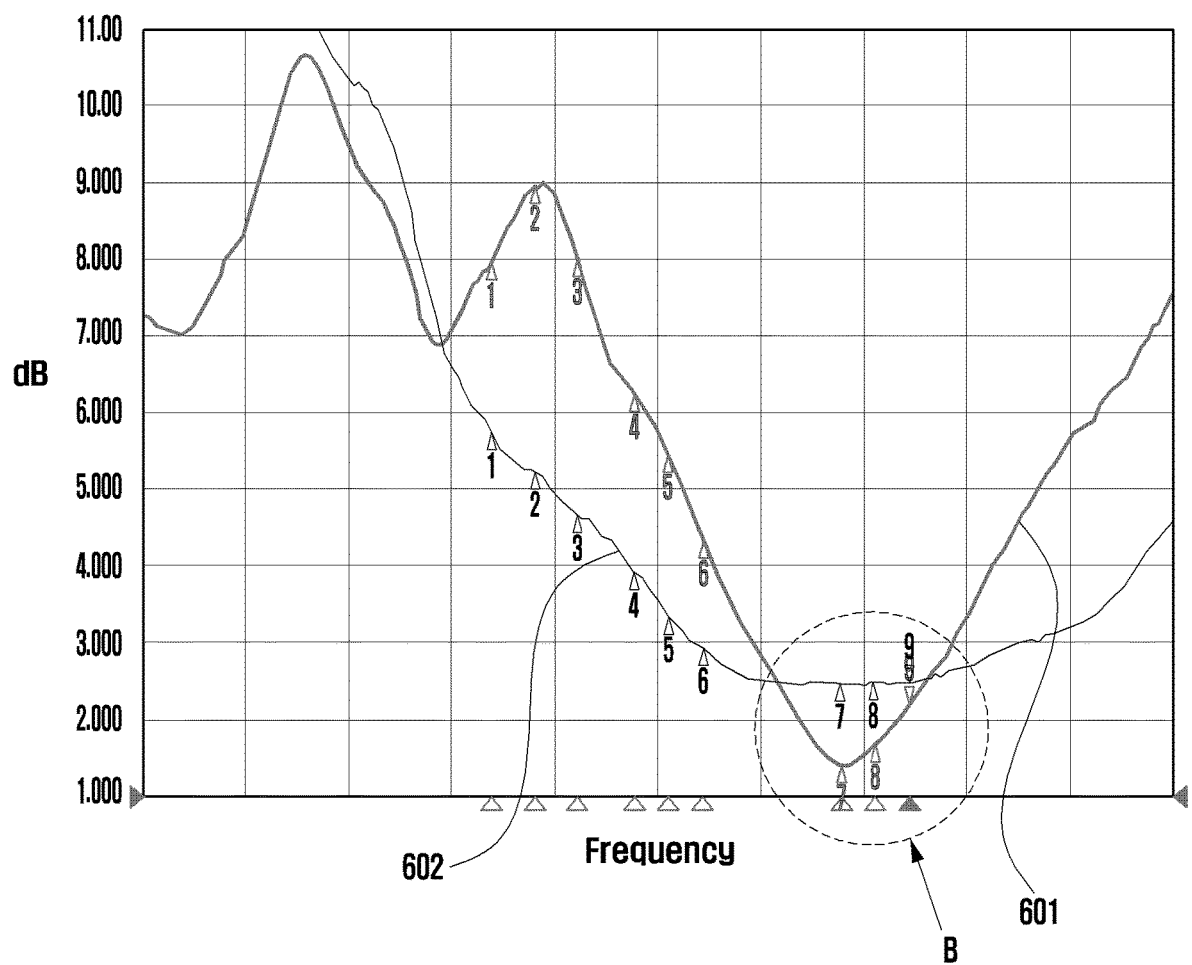
FIG. 6 is a graph illustrating an example radiation characteristic of an antenna with or without a second conductive pattern according to various embodiments of the disclosure.

FIG. 6 is a graph illustrating an example radiation characteristic of an antenna with or without a second conductive pattern 512 according to various embodiments of the disclosure.

FIG. 6 shows a return loss (e.g., voltage standing wave ratio (VSWR)) of the antenna with and without the second conductive pattern 512 capacitively coupled with the third conductive pattern 291 acting as the antenna. As shown, in a band (denoted by B) of about 2.1 GHz which is a desired operating frequency band, the radiation performance of the antenna is improved when the third conductive pattern 291 is used together with the capacitively coupled second conductive pattern 512 as the antenna (denoted by 601) in comparison with when the third conductive pattern 291 is used alone as the antenna (denoted by 602).

Figure 7A:
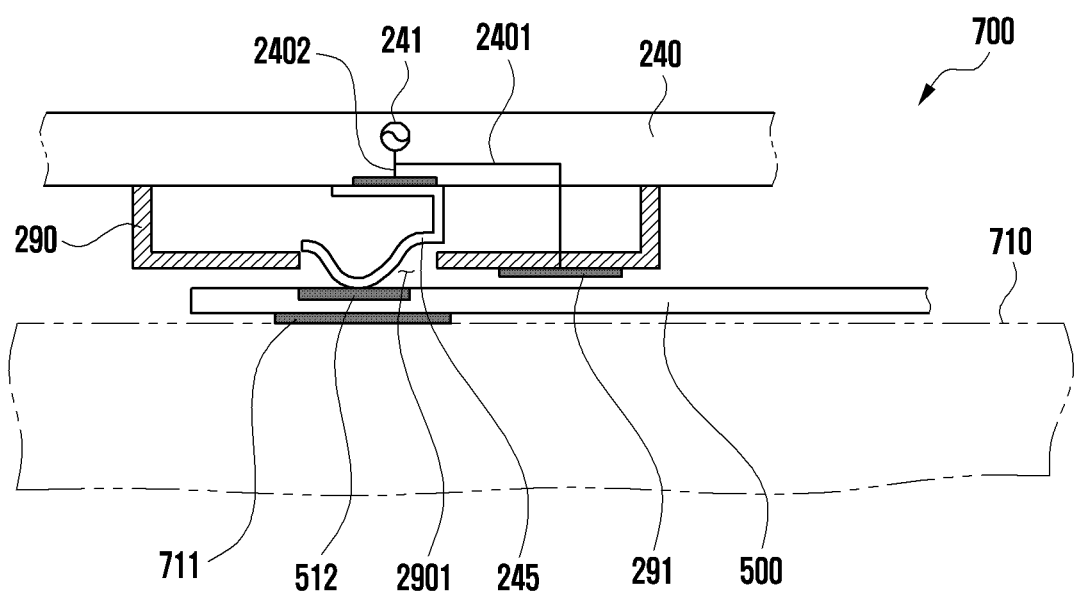
FIGS. 7A and 7B are diagrams illustrating an example electronic device in which a second conductive pattern of an antenna structure has a direct power-feeding mechanism according to various embodiments of the disclosure.
Figure 7B:
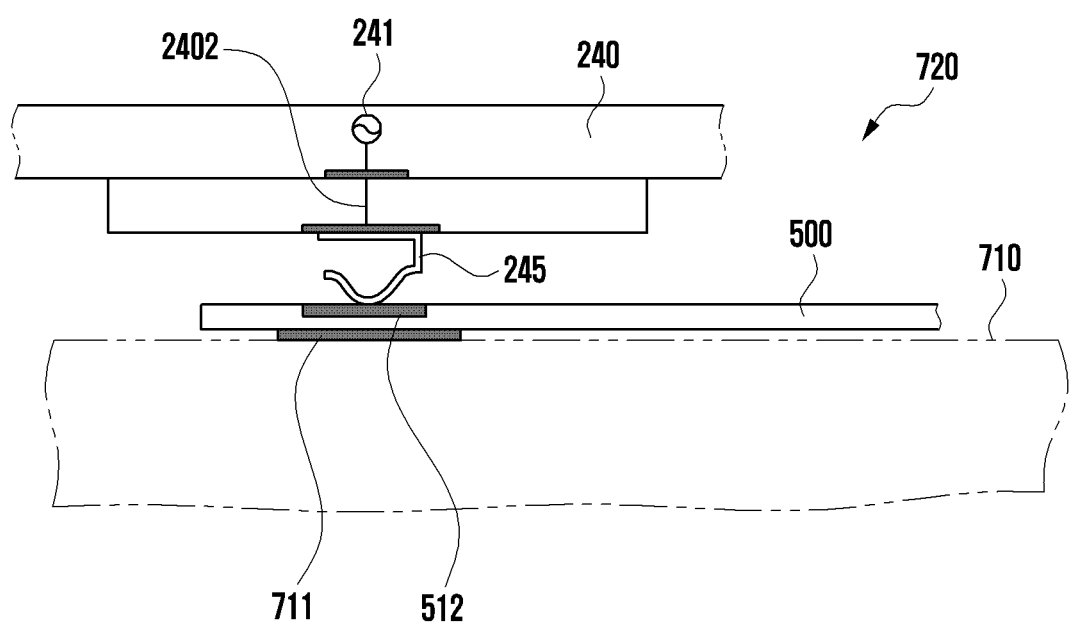

FIGS. 7A and 7B are diagrams illustrating example electronic devices 700 and 720 in which a second conductive pattern 512 of an antenna structure 500 includes a direct power-feeding mechanism according to various embodiments of the disclosure.

The electronic devices 700 and 720 of FIGS. 7A and 7B may be similar, at least in part, to the electronic device 200 of FIG. 2A, or may include other embodiments of the electronic device.

Referring to FIG. 7A, the electronic device 700 may include the PCB 240, the dielectric structure 290 mounted on the PCB 240, and the antenna structure 500 disposed through an additional structure 710 near the PCB 240. According to an embodiment, the additional structure 710 may include a battery (e.g., the battery 250 in FIG. 2C). According to an embodiment, the dielectric structure 290 may include an opening 2901, and an electrical connector 245 (e.g., a C-clip) mounted on the PCB 240 may protrude toward the antenna structure 500 through the opening 2901. According to an embodiment, the dielectric structure 290 may include the third conductive pattern 291 disposed on an outer surface thereof. According to an embodiment, the third conductive pattern 291 may be electrically connected to the wireless communication circuit 241 through a first electrical path 2401 (e.g., a wiring line) of the PCB 240. According to various embodiments, the electrical connector 245 may be electrically connected to the wireless communication circuit 241 through a second electrical path 2402 (e.g., a wiring line) disposed on the PCB 240.

According to various embodiments, when the assembly of the electronic device 700 is completed, the electrical connector 245 protruding at least in part from the opening 2901 of the dielectric structure 290 may be directly and electrically connected to the wireless communication circuit 240 by being in physical contact with the second conductive pattern 512 of the antenna structure 500. According to an embodiment, the electronic device 700 may include a tape member 711 disposed between the additional structure 710 and the antenna structure 500, thereby absorbing a pressing action of the electrical connector 245. According to an embodiment, the tape member 711 may be a conductive poron having a cushion property. In this case, both the second conductive pattern 512 and the third conductive pattern 291 are electrically connected to the wireless communication circuit 241 together, thereby being able to be used as a multi-band antenna.

Referring to FIG. 7B, the electronic device 720 may include the antenna structure 500 directly and electrically connected to the second conductive pattern 512 through the electrical connector 245 mounted on the PCB 240. According to an embodiment, the electrical connector 245 may be electrically connected to the wireless communication circuit 241 through the conductive path 2402 (e.g., a wiring line) formed on the PCB 240. In this case, the second conductive pattern 512 may operate as a single antenna radiator which is directly and electrically connected to the wireless communication circuit 241 without any additional pattern.

Figure 8:
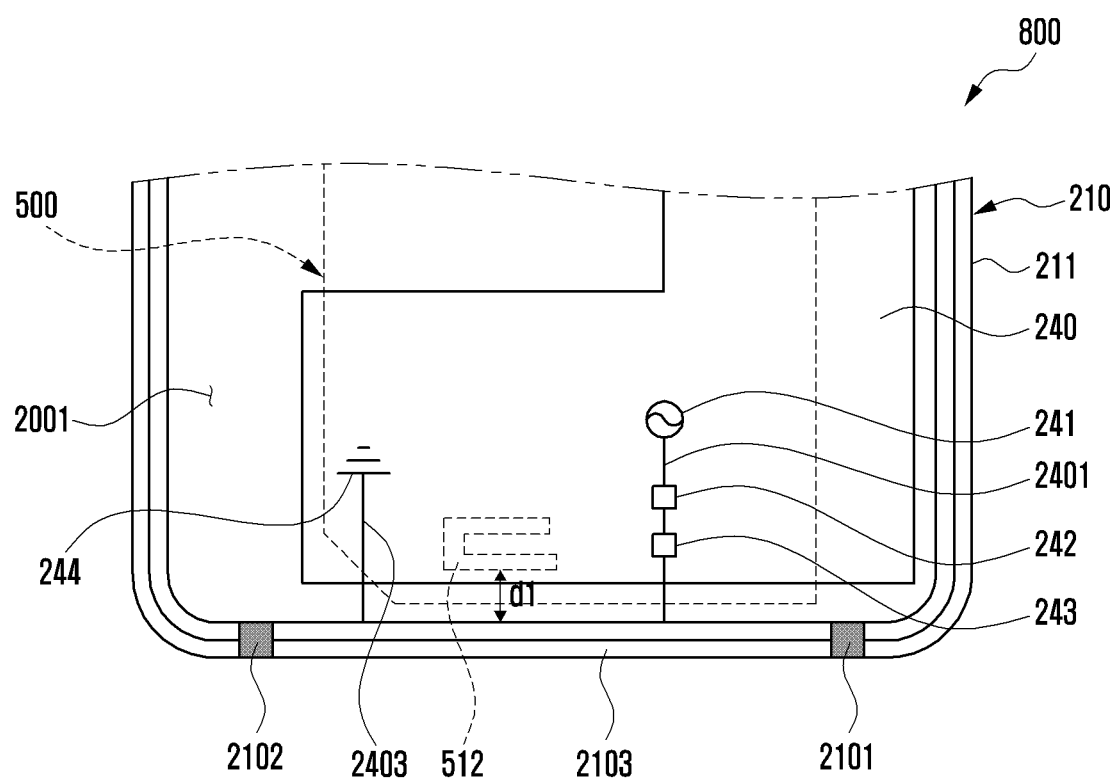
FIG. 8 is a diagram illustrating an example antenna arrangement of an electronic device according to various embodiments of the disclosure.

FIG. 8 is a diagram illustrating an example antenna arrangement of an electronic device 800 according to various embodiments of the disclosure.

The electronic device 800 of FIG. 8 may be similar, at least in part, to the electronic device 200 of FIG. 2A, or may include other embodiments of the electronic device.

Referring to FIG. 8, the electronic device 800 may include the housing 210 including the lateral member 211. According to an embodiment, the lateral member 211 may include a first nonconductive portion 2101, a second nonconductive portion 2102, and a conductive portion 2103. The first and second nonconductive portions 2101 and 2102 may be spaced apart from each other. According to an embodiment, the conductive portion 2103 may be electrically connected to the wireless communication circuit 241 disposed on the PCB 240, thereby being used as an antenna operating in a predetermined frequency band (e.g., a legacy band).

According to various embodiments, the conductive portion 2103 may be electrically connected to the wireless communication circuit 241 of the PCB 240 through a first electrical path 2401 (e.g., a wiring line). According to an embodiment, the electronic device 800 may include a matching circuit 242 disposed on the first electrical path 2401. According to an embodiment, the electronic device 800 may further include an electrostatic discharge (ESD) circuit 243 disposed on the first electrical path 2401. According to an embodiment, the conductive portion 2103 may be connected to a ground layer 244 of the PCB 240 through a second electrical path 2403 at a position spaced apart from a portion electrically connected to the wireless communication circuit 241.

According to various embodiments, the electronic device 800 may include the antenna structure 500 disposed in the inner space 2001. According to an embodiment, the antenna structure 500 may include at least one first conductive pattern (e.g., the first conductive pattern 511 in FIG. 4B). The at least one first conductive pattern 511 may be used for short-range communication such as, for example, and without limitation, NFC, WPC, MST, or the like. According to an embodiment, the antenna structure 500 may include the second conductive pattern 512 disposed near the first conductive pattern 511. According to an embodiment, the second conductive pattern 512 may be disposed at a distance (d1) from the conductive portion 2103 to be capacitively coupled with and thus electrically connected to the conductive portion 2103, thereby improving the radiation performance of the conductive portion 2103.

Figure 9A:
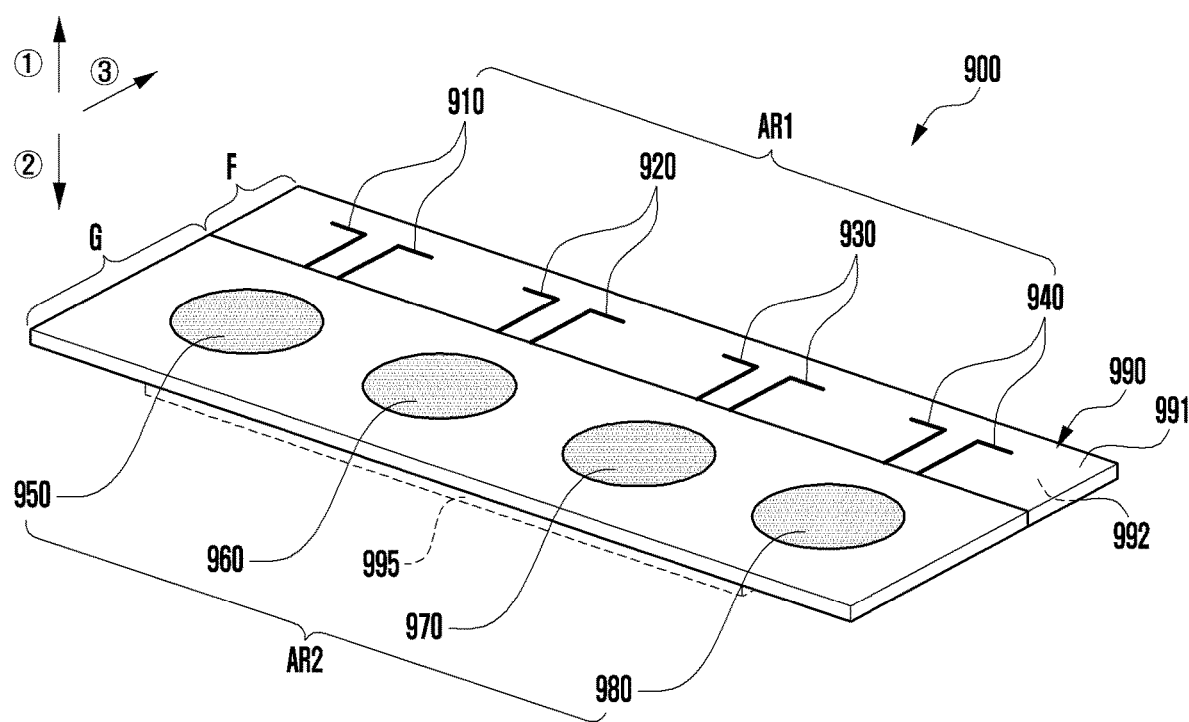
FIG. 9A is a perspective view illustrating an example configuration of a second antenna structure according to various embodiments of the disclosure.

FIG. 9A is a perspective view illustrating an example configuration of an example second antenna structure 900 according to various embodiments of the disclosure.

Referring to FIG. 9A, the second antenna structure 900 may include a substrate 990, a first antenna array AR1 disposed on the substrate 990, and a second antenna array AR2 disposed near the first antenna array AR1 on the substrate 990. According to an embodiment, the substrate 990 may have a first surface 991 facing a first direction (denoted by ①) and a second surface 992 facing a second direction (denoted by ②) opposite to the first surface 991. According to an embodiment, the first antenna array AR1 may include a plurality of conductive patterns 910, 920, 930, and 940 disposed at regular intervals in an inner space between the first and second surfaces 991 and 992 of the substrate 990. According to an embodiment, the first antenna array AR1 may be disposed in a fill-and-cut region F including a dielectric layer of the substrate 990. According to an embodiment, the second antenna array AR2 may include a plurality of conductive patches 950, 960, 970, and 980 exposed to the first surface 991 of the substrate 990 or disposed near the first surface 991 in the inner space between the first and second surfaces 991 and 992. According to an embodiment, the second antenna array AR2 may be disposed in a ground region G including a ground layer near the fill-and-cut region F of the substrate 590. According to an embodiment, the plurality of conductive patterns 910, 920, 930, and 940 may operate as a dipole antenna. According to an embodiment, the plurality of conductive patches 950, 960, 970, and 980 may operate as a patch antenna.

According to various embodiments, the second antenna structure 900 may further include a wireless communication circuit 995 mounted on the second surface 992 of the substrate 990 and electrically connected to the first and second antenna arrays AR1 and AR2. In another embodiment, the wireless communication circuit 995 may be disposed in an inner space of the electronic device spaced apart from the second antenna structure 900 and electrically connected to the substrate 990 through an electrical connection member (e.g., an FPCB connector). According to an embodiment, the wireless communication circuit 995 may be configured to transmit and/or receive a radio signal in a frequency range of about 3 GHz to about 100 GHz through the first antenna array AR1 and/or the second antenna array AR2.

Figure 9B:
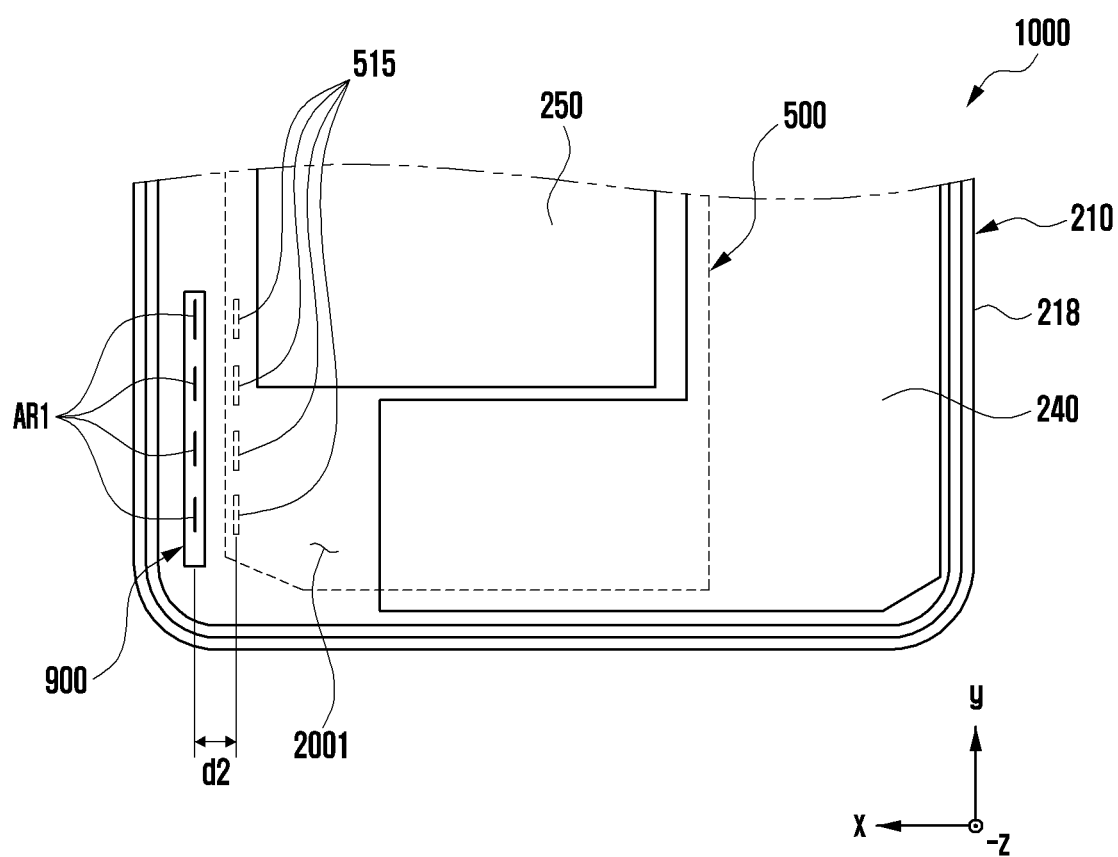
FIG. 9B is a diagram illustrating an example electronic device in which the second antenna structure of FIG. 9A is disposed according to various embodiments of the disclosure.

FIG. 9B is a diagram illustrating an example electronic device 1000 in which the second antenna structure 900 of FIG. 9A is disposed according to various embodiments of the disclosure.

The electronic device 1000 of FIG. 9B may be similar, at least in part, to the electronic device 200 of FIG. 2A, or may include other embodiments of the electronic device.

Referring to FIG. 9B, the second antenna structure 900 may be disposed in the inner space 2001 of the electronic device 1000 such that a beam pattern is formed in a third direction (z-axis direction) perpendicular to a first direction (x-axis direction) through the first antenna array AR1. According to an embodiment, the third direction may be a direction in which the rear plate 280 of the electronic device (e.g., the electronic device 200 in FIG. 2B) faces. According to an embodiment, the second antenna structure 900 may be disposed in the inner space 2001 of the electronic device 1000 such that a beam pattern is formed in the first direction (x-axis direction) through the second antenna array AR2. According to an embodiment, the first direction may be a direction in which the lateral member 218 faces.

According to various embodiments, the electronic device 1000 may include the first antenna structure 500 disposed in the inner space 2001 and overlapped at least in part with an internal structure (e.g., the PCB 240 and/or the battery 250). According to an embodiment, the first antenna structure 500 may include at least one first conductive pattern (e.g., the at least one first conductive pattern 511 in FIG. 4B). The at least one first conductive pattern 511 may be used for short-range communication such as, for example, and without limitation, NFC, WPC, MST, or the like. According to an embodiment, the first antenna structure 500 may include at least one second conductive pattern 515 disposed near the first conductive pattern 511. According to an embodiment, the second conductive pattern 515 may be disposed at a distance (d2) from the first antenna array AR1 so as to be capacitively coupled with and thus electrically connected to the first antenna array AR1, thereby improving the radiation performance of the second antenna structure 900.

According to various embodiments of the disclosure, the electronic device shares at least in part a mounting space of the antenna structure. This may contribute to a slim design of the electronic device and may also improve the antenna radiation performance through an additional radiator without expanding the mounting space.

According to various example embodiments, an electronic device (e.g., the electronic device 200 in FIG. 4C) may include: a housing (e.g., the housing 210 in FIG. 4C) including an inner space (e.g., the inner space 2001 in FIG. 4C), and a first antenna structure (e.g., the antenna structure 500 in FIG. 4C) disposed in the inner space of the housing, the first antenna structure including: a dielectric substrate (e.g., the dielectric substrate 510 in FIG. 3), at least one first conductor (e.g., the first conductive pattern 511 in FIG. 3) disposed in a first area (e.g., the first area A1 in FIG. 3) of the dielectric substrate, and at least one second conductor (e.g., the second conductive pattern 512 in FIG. 3) disposed in a second area (e.g., the second area A2 in FIG. 3) of the dielectric substrate extending from the first area of the dielectric substrate. The electronic device may further include at least one third conductor (e.g., the third conductive pattern 291 in FIG. 3) capacitively coupled with the at least one second conductor, a first wireless communication circuit (e.g., the wireless communication circuit 192 in FIG. 1) configured to transmit and/or receive a signal of a first frequency band through the at least one first conductor, and a second wireless communication circuit (e.g., the wireless communication circuit 241 in FIG. 5) configured to transmit and/or receive a radio signal of a second frequency band through the at least one second conductor and the at least one third conductor.

According to various example embodiments, the first wireless communication circuit may be configured to perform at least one of a near field communication (NFC) function, a wireless power consortium (WPC) function, or a magnetic secure transmission (MST) function through the at least one first conductor.

According to various example embodiments, the second wireless communication circuit may be configured to transmit and/or receive a radio signal in a frequency range of 800 MHz to 6000 MHz through the at least one second conductor and the at least one third conductor.

According to various example embodiments, the dielectric substrate may include a flexible printed circuit board (FPCB), and the at least one first conductor and the at least one second conductor may include at least one conductive pattern in the FPCB.

According to various example embodiments, the at least one first conductor may include a coil configured to transmit and/or receive a wireless charging signal.

According to various example embodiments, the electronic device may further include a dielectric structure (e.g., the dielectric structure 290 in FIG. 3) disposed in the inner space of the housing, and the at least one third conductor may include a laser direct structuring (LDS) pattern provided in the dielectric structure.

According to various example embodiments, the second wireless communication circuit may be electrically and physically connected to the at least one third conductor.

According to various example embodiments, the second wireless communication circuit may be electrically and physically connected to the at least one second conductor.

According to various example embodiments, the electronic device may further include a conductive shield (e.g., the conductive shielding member 513 in FIG. 4B) disposed between the at least one first conductor and the at least one second conductor.

According to various example embodiments, the conductive shield may be disposed to surround at least a part of the at least one first conductor in the second area.

According to various example embodiments, the housing may include a lateral portion (e.g., the lateral member 211 in FIG. 8) including a first nonconductive portion (e.g., the first nonconductive portion 2101 in FIG. 8), a second nonconductive portion (e.g., the second nonconductive portion 2102 in FIG. 8), and a conductive portion (e.g., the conductive portion 2103 in FIG. 8), the first and second nonconductive portions being spaced apart from each other, and the at least one third conductor may include the conductive portion of the lateral portion.

According to various example embodiments, the electronic device may further include a substrate (e.g., the substrate 990 in FIG. 9A) disposed in the inner space of the housing, and a second antenna structure (e.g., the second antenna structure 900 in FIG. 9A) including a plurality of first conductive patterns (e.g., the plurality of first conductive patterns 910, 920, 930, and 940 in FIG. 9A) disposed on the substrate, and the at least one third conductor may include the plurality of first conductive patterns.

According to various example embodiments, the second wireless communication circuit may be configured to transmit and/or receive a radio signal in a frequency range of 3 GHz to 100 GHz through the plurality of first conductive patterns and the at least one second conductor.

According to various example embodiments, the plurality of first conductive patterns may include a dipole antenna.

According to various example embodiments, the housing may include a cover (e.g., the front cover 202 in FIG. 3), and the electronic device may further include a display (e.g., the display 201 in FIG. 3) disposed in the inner space of the housing to be viewable an outside through at least a part of the cover.

According to various example embodiments, an electronic device (e.g., the electronic device 200 in FIG. 4C) may include a housing (e.g., the housing 210 in FIG. 4C) including an inner space (e.g., the inner space 2001 in FIG. 4C), and a first antenna structure (e.g., the antenna structure 500 in FIG. 4C) disposed in the inner space of the housing, the first antenna structure including: a dielectric substrate (e.g., the dielectric substrate 510 in FIG. 3), at least one first conductor (e.g., the first conductive pattern 511 in FIG. 3) disposed in a first area (e.g., the first area A1 in FIG. 3) of the dielectric substrate, and at least one second conductor (e.g., the second conductive pattern 512 in FIG. 3) disposed in a second area (e.g., the second area A2 in FIG. 3) of the dielectric substrate extending from the first area of the dielectric substrate. The electronic device may further include a first wireless communication circuit (e.g., the wireless communication circuit 192 in FIG. 1) configured to transmit and/or receive a signal of a first frequency band through the at least one first conductor, and a second wireless communication circuit (e.g., the wireless communication circuit 241 in FIG. 5) configured to transmit and/or receive a radio signal of a second frequency band through the at least one second conductor.

According to various example embodiments, the first wireless communication circuit may be configured to perform at least one of a near field communication (NFC) function, a wireless power consortium (WPC) function, or a magnetic secure transmission (MST) function through the at least one first conductor.

According to various example embodiments, the second wireless communication circuit may be configured to transmit and/or receive a radio signal in a frequency range of 800 MHz to 6000 MHz through the at least one second conductor.

According to various example embodiments, the dielectric substrate may include a flexible printed circuit board (FPCB), and the at least one first conductor and the at least one second conductor may include at least one conductive pattern provided in the FPCB.

According to various example embodiments, the electronic device may further include at least one third conductor disposed in the inner space and capacitively coupled with the at least one second conductor.

While the disclosure has been illustrated and described with reference to various example embodiments thereof, it will be understood by those skilled in the art that the various example embodiments are intended to be illustrative, not limiting, and that various changes in form and detail may be made without departing from the scope of the disclosure, including the appended claims.

What is claimed is:

1. An electronic device comprising:
a housing including a cover and an inner space;
a display disposed in the inner space of the housing to be viewable to an outside through at least a part of the cover;
a first antenna structure disposed in the inner space of the housing, the first antenna structure including:
a dielectric substrate,
at least one first conductor disposed in a first area of the dielectric substrate, and
at least one second conductor disposed in a second area of the dielectric substrate extending from the first area of the dielectric substrate; and
at least one third conductor disposed at a position overlapping at least a part of the at least one second conductor when viewed from the outside through the display and capacitively coupled with the at least one second conductor;
a first wireless communication circuit configured to transmit and/or receive a signal of a first frequency band through the at least one first conductor; and
a second wireless communication circuit configured to transmit and/or receive a radio signal of a second frequency band that is different from the first frequency band through the at least one second conductor and the at least one third conductor.

2. The electronic device of claim 1, wherein the first wireless communication circuit is configured to perform at least one of a near field communication (NFC) function, a wireless power consortium (WPC) function, or a magnetic secure transmission (MST) function through the at least one first conductor.

3. The electronic device of claim 1, wherein the second wireless communication circuit is configured to transmit and/or receive a radio signal in a frequency range of 800 MHz to 6000 MHz through the at least one second conductor and the at least one third conductor.

4. The electronic device of claim 1, wherein the dielectric substrate includes a flexible printed circuit board (FPCB), and
wherein the at least one first conductor and the at least one second conductor include at least one conductive pattern provided in the FPCB.

5. The electronic device of claim 1, wherein the at least one first conductor includes a coil configured to transmit and/or receive a wireless charging signal.

6. The electronic device of claim 1, further comprising:
a dielectric structure disposed in the inner space of the housing,
wherein the at least one third conductor includes a laser direct structuring (LDS) pattern provided in the dielectric structure.

7. The electronic device of claim 1, wherein the second wireless communication circuit is electrically and physically connected to the at least one third conductor.

8. The electronic device of claim 1, wherein the second wireless communication circuit is electrically and physically connected to the at least one second conductor.

9. The electronic device of claim 1, further comprising:
a conductive shield disposed between the at least one first conductor and the at least one second conductor.

10. The electronic device of claim 9, wherein the conductive shield is disposed to at least partially surround the at least one second conductor in the second area of the dielectric substrate.

11. The electronic device of claim 1, wherein the housing includes a lateral portion including a first nonconductive portion, a second nonconductive portion, and a conductive portion, the first and second nonconductive portions being spaced apart from each other, and
wherein the at least one third conductor includes the conductive portion of the lateral portion.

12. The electronic device of claim 1, further comprising:
a substrate disposed in the inner space of the housing; and
a second antenna structure including a plurality of first conductive patterns disposed on the substrate,
wherein the at least one third conductor includes the plurality of first conductive patterns.

13. The electronic device of claim 12, wherein the second wireless communication circuit is configured to transmit and/or receive a radio signal in a frequency range of 3 GHz to 100 GHz through the plurality of first conductive patterns and the at least one second conductor.

14. The electronic device of claim 12, wherein the plurality of first conductive patterns include a dipole antenna.

15. The electronic device of claim 1, wherein the at least one third conductor is disposed above the dielectric substrate and between the display and the at least one second conductor without overlapping the at least one first conductor when viewed from the outside through the display.

16. An electronic device comprising:
a housing including an inner space;
a first antenna structure disposed in the inner space of the housing, the first antenna structure including:
a dielectric substrate,
at least one first conductor disposed in a first area of the dielectric substrate, and
at least one second conductor disposed in a second area of the dielectric substrate extending from the first area of the dielectric substrate; and
a first wireless communication circuit configured to transmit and/or receive a signal of a first frequency band through the at least one first conductor;
a second wireless communication circuit configured to transmit and/or receive a radio signal of a second frequency band through the at least one second conductor that is different from the first frequency band; and
a conductive shield disposed in the dielectric substrate and between the at least one first conductor and the at least one second conductor, wherein the conductive shield is disposed to at least partially surround the at least one second conductor in the second area of the dielectric substrate on a plurality of sides of the at least one second conductor to reduce an affect the at least one first conductor and the second conductor have on each other.

17. The electronic device of claim 16, wherein the first wireless communication circuit is configured to perform at least one of a near field communication (NFC) function, a wireless power consortium (WPC) function, or a magnetic secure transmission (MST) function through the at least one first conductor.

18. The electronic device of claim 16, wherein the second wireless communication circuit is configured to transmit and/or receive a radio signal in a frequency range of 800 MHz to 6000 MHz through the at least one second conductor.

19. The electronic device of claim 16, wherein the dielectric substrate includes a flexible printed circuit board (FPCB), and
wherein the at least one first conductor and the at least one second conductor include at least one conductive pattern provided in the FPCB.

20. The electronic device of claim 16, further comprising:
at least one third conductor disposed in the inner space and capacitively coupled with the at least one second conductor.

* * * * *